(12) United States Patent
Okano et al.

(10) Patent No.: US 7,284,051 B1
(45) Date of Patent: Oct. 16, 2007

(54) RELAYING APPARATUS FOR USE IN A NETWORK SYSTEM

(75) Inventors: Tetsuya Okano, Kanagawa (JP); Takeshi Aoki, Tama (JP); Eiichi Takaha, Kanagawa (JP); Shinji Kikuchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/455,932

(22) Filed: Dec. 7, 1999

(30) Foreign Application Priority Data

Dec. 28, 1998 (JP) .................................. 10-372441

(51) Int. Cl.
*G06F 15/173* (2006.01)
(52) U.S. Cl. ..................... 709/226; 709/224; 709/238
(58) Field of Classification Search ................ 709/224, 709/105, 223, 102, 200, 201, 202, 203, 227, 709/228, 236, 238; 713/105
See application file for complete search history.

(56) References Cited

U.S. PATENT DOCUMENTS

| | | | | |
|---|---|---|---|---|
| 5,548,724 A | * | 8/1996 | Akizawa et al. | 709/203 |
| 5,598,471 A | * | 1/1997 | Rademeyer | 380/238 |
| 6,014,700 A | * | 1/2000 | Bainbridge et al. | 709/104 |
| 6,128,279 A | * | 10/2000 | O'Neil et al. | 709/226 |
| 6,128,644 A | * | 10/2000 | Nozaki | 709/201 |
| 6,128,657 A | * | 10/2000 | Okanoya et al. | 709/224 |
| 6,263,368 B1 | * | 7/2001 | Martin | 709/224 |
| 6,324,580 B1 | * | 11/2001 | Jindal et al. | 709/105 |
| 6,327,622 B1 | * | 12/2001 | Jindal et al. | 709/105 |
| 6,330,602 B1 | * | 12/2001 | Law et al. | 370/401 |
| 6,449,647 B1 | * | 9/2002 | Colby et al. | 709/226 |
| 6,647,008 B1 | * | 11/2003 | Galand et al. | 370/389 |
| 6,704,278 B1 | * | 3/2004 | Albert et al. | 370/216 |

FOREIGN PATENT DOCUMENTS

| | | |
|---|---|---|
| CA | 2241016 | 12/1998 |
| JP | HEI 10-278615 | 9/1998 |
| JP | 10-307783 | 11/1998 |
| JP | HEI 10-307783 | 11/1998 |
| JP | HEI 11-27320 | 1/1999 |
| WO | WO 98/26559 | 6/1998 |

OTHER PUBLICATIONS

"Dynamic Computation of TCP Maximum Window Size for Directly Connected Hosts." Apr. 1, 1994. IBM Technical Disclosure Bulletin, vol. 37, issue 4A, pp. 601-608.*

(Continued)

*Primary Examiner*—Glenton B. Burgess
*Assistant Examiner*—Aaron Strange
(74) *Attorney, Agent, or Firm*—Staas & Halsey LLP

(57) ABSTRACT

A relaying apparatus comprises a client terminal, many server terminals connected via network to the client terminal, a DNS responding device which accepts a DNS inquiry from the client terminal via a client-side DNS device, and one path load measuring device for each of the server terminals which measures a load in the communication path up to the client-side DNS device. The DNS responding device distributes a work load by routing a service request from the client terminal to any one of the server terminals based on the measurement result (i.e. route load).

5 Claims, 9 Drawing Sheets

OTHER PUBLICATIONS

Cisco Systems, Inc., "Cisco Distributed Director", Sep. 30, 1997, (Abstract Only).

Michael Hasenstein, "IP Address Translation", 1997.

Practical Use of Directory-Enabled Network: Target is Realization of Functions Such as QoS & Serve for Intranet Management, Nikkei Internet Technology, vol. 12, pp. 120-125, published Jun. 22, 1998 by Nikkei BP Corp.

Kikuchi, "Flood Of Load Reducing Technologies For Crowded Internet Servers", Nikkei Communications, vol. 258, Nikkei Business Publications, Inc., Nov. 17, 1997, pp. 130-133.

English language translation of Japanese Office Action citing JP 10-307783, Kawai, "Practical Use of Directory-Enabled Network: Target is Realization of Functions Such As Qos & Serve for Intranet Management" and Kikuchi, "Flood Of Load Reducing Technologies For Crowded Internet Servers."

Translation of Paragraphs, [0037], [0040]and [0042]of JP10-307783.

* cited by examiner

RELAYING APPARATUS FOR USE IN A NETWORK SYSTEM

FIELD OF THE INVENTION

The present invention relates to a relaying apparatus used in a network system for relaying a request for service (IP packet) from a client terminal to a server terminal. More specifically, this invention relates to a relaying apparatus for selecting an optimal destination for relay.

BACKGROUND OF THE INVENTION

In recent years, in a large-scale network as represented by Internet, to solve the problem of concentration of work load to one server terminal, there has been used the load distributing technology in which a plurality of server terminals are prepared in a server accessed from many client terminals so that the plurality of server terminals seem to function as one unit of server terminal to each client terminal.

This load distributing technology is a technology which reduces a work load on one unit of server terminal by distributing the access from client terminals to the plurality of server terminals. Accordingly, in the load distributing technology, when access is made from a client terminal, in order to improve the network efficiency it is important to route the access to a server terminal having the lowest load and shortest distance from the client terminal having made the access.

FIG. 9 shows the configuration of a conventional type of relaying apparatus for use in a network system. As shown in this figure, an external network 1 is a large-scale network for data communications between a plurality of computers located at physically remote sites from each other. An example of this network is the Internet.

A network satisfying the following conditions can be classified as the Internet described above.

(1) The computer network has a communication protocol called TCP/IP (Transmission Control Protocol/Internet Protocol) installed therein.

(2) The computer network is connected to a global network comprising several major networks.

The protocols that can be used as the TCP/IP described above are the TCP and UDP (User Datagram Protocol) protocols defined in the fourth layer (transport layer) of the OSI (Open Systems interconnection). A feature of the TCP consists in that reliable data communications (transfer) can be carried out. In other words, the reliability of a communication path is maintained from the start to the end of the communication for enabling normal communication control, detection of an error and restoration from the error.

In contrast to the fact that the TCP provides a connection type of service for insuring reliability, the UDP is so-called a connection-less type of data transfer protocol for realization of high speed processing. In UDP such operations as confirmation of a response to improvement of reliability or sequence adjustment of received data transmitted through different routes in a network are not carried out.

A router 2 is connected to an external network 1, and obtains an IP address from an input IP packet and applies this IP packet to a routing table to execute a relay operation for transferring the IP packet for a router as a destination for transfer or a terminal (not shown herein). This relaying operation by the router 2 is called as routing (selection of a communication path). This IP address is assigned to a router as a destination for transfer or a terminal. The routing table is a table that shows a relation between a plurality of IP addresses and destinations for transfer corresponding to the IP addresses respectively.

A cluster network 3 is connected to the router 2 and accommodates therein a client terminal $4_1$, client terminal $4_2$, and a client-side DNS server 5. The client terminal $4_1$ and client terminal $4_2$ are the terminals provided in the client (user) side for requesting a service to a server terminal 7, a server terminal 9, and a server terminal 12 by sending the IP packet via the cluster network 3 to the router 2. The client-side DNS server 5 is a server for realization of the DNS (Domain Name System) which is one of Internet standards, and is connected to the cluster network 3.

The DNS will be explained in detail below. The IP address is used as explained above for identifying a terminal. However, this IP address comprises a combination of figures, so that it is very difficult for a user to remember the IP address. In order to solve this problem, a domain name (name space) is assigned to each terminal as an ID name which is easy for users to understand. The DNS is a system that manages a correspondence between domain names and IP addresses and returns an IP address in response to an inquiry with a domain name from the terminals (client terminal $4_1$ and client terminal $4_2$) Thus, the client side DNS server 5 is a device that realizes the DNS and is a local DNS server against the client terminal $4_1$ and client terminal $4_2$.

A router 6 is connected between the external network 1 and a server terminal 7, and has a routing function like that of the router 2 described above. This server terminal 7 is provided in the side of a service provider, and provides a service to the client terminal $4_1$ and client terminal $4_1$ in response to a request from the client terminal $4_1$ and client terminal $4_2$.

The router 8 is connected between the external network 1 and a server terminal 9, and has a routing function like that of the router 2. The server terminal 9 is a terminal for providing a service to the client terminal $4_1$ and client terminal $4_2$ in response to a request from the client terminal $4_1$ and client terminal $4_2$.

A router 10 is connected between the external network 1 and a cluster network 11, and has a routing function like that of the router 2. A server terminal 12 is connected to this cluster network 11. The server terminal 12 is a terminal for providing, like the server terminal 7 described above, a service to the client terminal $4_1$ and client terminal $4_2$ in response to a request from the client terminal $4_1$ and client terminal $4_2$.

The server terminals 7, 9, and 12 are provided at physically different positions. Accordingly, distance between each of the server terminals 7, 9, and 12 and the client terminal $4_1$ or client terminal $4_2$ (client-side DNS device 5) is different. Further, the server terminal 7, server terminal 9, and server terminal 12 functions like one unit of server terminal when viewed from the client terminal $4_1$ or client terminal $4_2$. Further, one domain name (described as a representative domain name) is assigned to all of the server terminal 7, server terminal 9, and server terminal 12 with different IP addresses assigned to the terminals respectively.

Namely in this case, a plurality of IP addresses are registered with one domain name, and when the client terminal $4_1$ and client terminal $4_2$ access with one domain name, any one of the server terminal 7, server terminal 9, and server terminal 12 can be accessed. Namely, the server terminal 7, server terminal 9, and server terminal 12 form one virtual server terminal specified by a representative domain name, and the client terminal $4_1$ and client terminal $4_2$ access a virtual IP address (representative domain name) of this virtual server terminal.

The configuration as described above in which a common domain name are assigned to the server terminal 7, server terminal 9, and server terminal 12 and any one of the server terminal 7, server terminal 9, and server terminal 12 can be accessed from the client terminal $4_1$ and client terminal $4_2$ is employed in order to distribute the work load as described above. Description is made later for the distribution of work load.

A DNS responding device 13 has a function as a DNS server like the client-side DNS server 5, and is positioned as an upper device to the client-side DNS server 5. Namely, the DNS responding device 13 has a function of responding to an inquiry on an IP address from the client-side DNS server 5. Further, the DNS responding device 13 puts the server terminal 7, server terminal 9, and server terminal 12 under control thereby, and when an inquiry is made for converting a representative domain name to an IP address, converts the representative domain name to an IP address of any one of the server terminal 7, server terminal 9, and server terminal 12, and reports it to the client-side DNS server 5. Namely, the DNS responding device 13 routes an access request from the client terminal $4_1$ and client terminal $4_2$ to any one of the server terminal 7, server terminal 9, and server terminal 12. This routing is the distribution of workload described above.

In the configuration described above, when access is made to a virtual server terminal having the virtual IP address described above, for instance, the client terminal $4_1$ notices the client-side DNS server 5 of the representative domain name via the cluster network 3 to make an inquiry for a virtual IP address of the virtual server terminal to the client-side DNS server 5.

Thus the client-side DNS server 5 makes an enquiry for the virtual IP address to the DNS responding device 13 through the cluster network 3, router 2, external network 1, router 10 and cluster network 11. More specifically, the client-side DNS server 5 notices the DNS responding device 13 of the representative domain name.

Assuming herein that the server terminal 7 is a first server terminal, the server terminal 9 is a second server terminal, and server terminal 12 is a third server terminal, the DNS responding device 13 at first converts the reported representative domain name to an IP address of the first server terminal 7. The DNS responding device 13 then reports the IP address of the server terminal 7 via the cluster network 11, router 10, external network 1 and router 2 to the client-side DNS server 5. In response to this action, the client-side DNS server 5 reports the IP address of the server terminal 7 to the client terminal $4_1$ through the cluster network 3.

The client terminal $4_1$ that has received the IP address sends an IP packet including the IP address of the server terminal 7 via the cluster network 3 to the router 2. Thus, the IP packet is routed by the router 2, passes through the external network 1 and is further routed by the router 6, and arrives at the server terminal 7. As a result, connection between the client terminal $4_1$ and server terminal 7 is established and the server terminal 7 provides a service requested by the client terminal $4_1$.

In reality, although not shown, a plurality of routers are present within the external network and the IP packet is routed by and transferred through these routers.

When the representative domain name is reported by the client terminal $4_1$ via the cluster network 3 to the client-side DNS server 5, the client-side DNS server 5 makes an inquiry of the virtual server terminal via the router 2, external network 1, router 10, and cluster network 11 to the DNS responding device 13.

The NDS responding device 13 then converts the reported representative domain name to an IP address of the second server terminal 9. The responding device 13 reports the IP address of the server terminal 9 via the cluster network 11, router 10, external network 1 and router 2 to the client-side DNS server 5. The client-side DNS server 5 reports the IP address of the server 9 via the cluster network 3 to the client terminal $4_2$. The client terminal $4_2$ having received the IP address sends an IP packet including the IP address of the server terminal 9 via the cluster network to the router 2. After the IP packet is routed by the router 2, the IP packet passes through the external network and is further routed by the router 8, and arrives at the server terminal 9. As a result, a connection between the client terminal $4_2$ and the server terminal 9 is established, and the server terminal 9 provides the service requested from the client terminal $4_2$.

Each time the DNS responding device 13 receives an inquiry on an IP address, the DNS responding device 13 successively reports the IP address of the third server terminal 12, the IP address of the first server terminal 7, and the IP address of the second server terminal 9 to the client-side DNS server 5. In other words, each time the DNS responding device 13 receives an inquiry concerning an IP address, the DNS responding device 13 distributes work load by routing an access from the client terminal $4_1$ (or the client terminal $4_2$) to the server terminal 12 to server terminal 7 to server terminal 9 to server terminal 12 to . . . in this order.

In the relaying apparatus used in the network system based on the conventional technology, an access request (IP packet) is routed simply to server terminal 12 to the server terminal 9 to server terminal 7 to server terminal 12 to . . . in this order according to an order of inquiries on an IP address from the client terminal $4_1$ (or client terminal $4_2$).

However, in the above method the following problems occurs because a distance between the client terminal $4_1$ (or the client terminal $4_2$) and each of the server terminal 7, server terminal 9, or server terminal 12 is not taken into account at all.

For instance, when an access request (IP packet) from the client terminal $4_1$ is routed to the server terminal 7, although the distance between the client terminal $4_1$ and the server terminal 7 is longer than the distance between the client terminal 4 and server terminal 9, routing to the server terminal 9 connectable to the client terminal $4_1$ through the shortest route can not be carried out. Accordingly, in this case, the client terminal $4_1$ having accessed the server terminal 7 is requires a longer access time than that in accessing the server terminal 9. It is not preferable when viewed from a view point of efficiency in load distribution or network efficiency.

In order to solve this problem, in the relaying apparatus for use in a network system based on the conventional technology, in routing an access request (IP packet), a distance between each of the server terminal 7, server terminal 9, and server terminal 12 and the client terminal 4 is estimated from a number of hops and this distance is taken into account. The number of hops is a number of routers through which an IP packet having been transmitted from a transmission source (for instance, client terminal $4_1$) passes before it reaches a final destination (for instance, server terminal 7).

More specifically, when, for instance, the client terminal $4_1$ issues a request for access and a representative domain name is reported from the client terminal $4_1$ to the client-side DNS server 5, the client-side DNS server 5 reports the representative domain name via the cluster network 13, router 2, external network 1, router 10, and cluster network 11, like in the operation described above, to the DNS responding device 13.

In response to the above action, at first the DNS responding device 13 estimate a distance between the client terminal $4_1$ and the server terminal 7 (described as a first distance hereinafter) according to a number of hops between the client terminal having issued the access request (client terminal $4_1$) and the server terminal 7. The DNS responding device 13 then computes a distance between the client terminal $4_1$ and the server terminal 9 (described as a second distance hereinafter) according to a number of hops between the client terminal $4_1$ and the server terminal 9.

Finally, the DNS responding device 13 computes a distance between the client terminal $4_1$ and the server terminal 12 (described as a third distance hereinafter) according to a number of hops between the client terminal $4_1$ and the server terminal 12. It should be noted that, in the DNS responding device 13, the first, second, and third distances are stored in a database. When estimation of the first, second, and third distances is finished, the DNS responding device 13 selects one of the first, second, and third distances which is estimated as the shortest one. In this case, assuming that the second distance is estimated as the shortest one, the DNS responding device 13 reports the IP address of the server terminal 9 corresponding to this second distance via the cluster network 11, router 10, external network 1, router 2, and cluster network 3 to the client-side DNS server 5.

After an IP address of the server terminal 9 is reported from the client-side DNS server 5 via the cluster network 3 to the client terminal $4_1$ the client terminal $4_1$ having received this IP address accesses the server terminal 9 via the cluster network 3, router 2, external network 1, and router 8, and receives a service from the server terminal 9. Namely, in this case, the server terminal 9 estimated as the nearest one is routed to the client terminal $4_1$.

As described above, in a relaying apparatus for use in a network system based on the conventional technology, first, second, and third distances between a client terminal (for instance, client terminal $4_1$) and server terminals (the server terminal 7, server terminal 9, and server terminal 12) are estimated according to a number of hops between the client terminal and each of the server terminal 7, server terminal 9, and server terminal 12, and a service request from the client terminal (IP packet) is routed to a server terminal estimated as the nearest one for distribution of work load.

However, as well known, the number of hops is not always proportional to the distance. Namely, in a case where a number of routers are present in a small-scale network, the number of hops are large, but the actual distance is short because the network scale is small. In this case, the DNS responding device 13 estimates a distance which is longer than the actual one because of the large number of hops. Namely, an error between a distance estimated by the DNS responding device 12 and the actual distance is very large.

In the relaying apparatus for use in a network system based on the conventional technology, thus, a service request (IP packet) is routed according to only a number of hops as a basis for estimation of a distance including a very large estimation error. Therefore, some times the work load can not be distributed in an optimal form.

Further, even when a server terminal to which a service request (IP packet) is routed is in a high work load state and actually can not accept a request for service, routing is made only according to the estimated distance.

In the case as described above, as a client terminal having acquired an IP address of the server terminal in the high work load state can not receive a service from the server terminal, so that some time there may occur a state in which the client terminal can not receive a service unless re-acquiring an IP address of another server terminal in a low load state.

Thus, sometimes there occurs an unreasonable state that, even though there is a server terminal in a low work load state, a service request (IP packet) is routed to a server terminal in a high load state, which is not desirable for distribution of work load. Namely in a relaying apparatus for use in a network system based on the conventional technology, sometimes when a service request (IP packet) is routed according to a reference not reflecting the actual state, optimal work load distribution can not be carried out.

SUMMARY OF THE INVENTION

The present invention is made in the light of the circumstances as described above. It is an object of the present invention to provide a relaying apparatus for use in a network system which can execute optimal work load distribution according to a reference reflecting an actual situation.

In one aspect of this invention, each route load measuring unit provided in the vicinity of each server terminals measures the load in the route up to one client terminal having issued a request for service out of many client terminals, and a selecting unit selects one server terminal out of the several server terminals as a destination of the request for service from the client terminal based on the route load measured the route load measuring units. When a service request is issued from the client terminal, the path load up to the client terminal is measured by the route load measuring unit. The selecting unit selects a server terminal out of many server terminals as a destination of routing a service request based on this path load. Therefore, one client can access one server and receive the service provided by it.

Thus, destination of routing a service request is selected based on the path load. Therefore, the work load can be distributed optimally among many server terminals.

Further, the path load measuring units previously measure the load in the route up to one client terminal at a predetermined time interval and measured path load is stored in a storing unit. When a service request is issued from the client terminal, the selecting unit selects one server terminal as a destination of routing the service request based on the path loads stored in the storing unit. The client terminal can access the server terminal selected in the manner as described above and receive a service from the server terminal.

Thus, the path loads measured each of the path load measuring units is previously stored in the storing unit, and when a service request is issued from the client terminal, immediately the service request is immediately routed to an appropriate server terminal without executing real time measurement by the path load measuring units. Therefore, work load can be distributed optimally and quickly among many server terminals.

Further, each of the route load measuring units monitors the operating states of respective server terminal. When a request for service is received from the client terminal, the selecting unit selects a server terminal as a destination of the request for service from the client terminal based on the route load and the operating states monitored by the load measuring units. Accordingly, the client terminal can access a server terminal which is in the best operating condition and receive a service provided by this server terminal.

Thus, not only the path load but also the operating state of a server terminal is taken into account when selecting a destination of routing a service request. Therefore, work load can further optimally be distributed among the many server terminals.

In another aspect of this invention, the server terminals are grouped, each route load measuring unit provided with respect to each of the groups measures a respective load in the route up to the client terminal having issued a request for service out many terminals, and a selecting unit selects one route load measuring unit as a primary destination of the request for service from a client terminal based on the route load measured by said route load measuring units. This route load measuring unit then selects one server terminal in the group as a secondary destination of the request for service from the client terminal.

Thus, primary destination of routing a service request is selected based on the path load which reflects the actual situation, and a server terminal is then selected by secondary routing. Therefore, work load can be optimally distributed among the many server terminals.

Further, when a request for service is received from the client terminal, the route load measuring unit measures a respective load in the route up to the client terminal and a route load measuring unit is selected as a primary destination by the selecting unit based on the route load. Then this route load measuring unit selects one server terminal in the group as a server terminal for secondary destination of routing.

Thus, the primary destination of routing the service request is selected based on the path load which reflects the actual situation, and a server terminal is selected as a secondary destination of routing based on its operating state. Therefore, work load can further optimally be distributed among the many server terminals.

In another aspect of this invention, the server terminals are grouped, each route load measuring unit provided with respect to each of the groups measures a respective load in the route up to a client terminal having issued a request for service and also monitors the operating state of the server terminals in each group, and a selecting unit selects one route load measuring unit as a primary destination of the request for service from the client terminal based on the route load measured and operating state monitored by the route load measuring units. This route load measuring unit then selects based on the operating state one server terminal out of the several server terminals in the group as a secondary destination of the request for service from the client terminal.

Thus, the primary destination of routing a service request is selected based on the path load which reflects the actual situation and also the operating state of each server terminal. A server terminal is selected by means of secondary routing based on its operating state. Therefore, work load can further optimally be distributed among many server terminals.

Other objects and features of this invention will become apparent from the following description with reference to the accompanying drawings.

DESCRIPTION OF THE PREFERRED EMBODIMENTS

Four embodiments of a relaying apparatus for use in a network system according to the present invention are explained below with reference to the related drawings.

Figure 1:
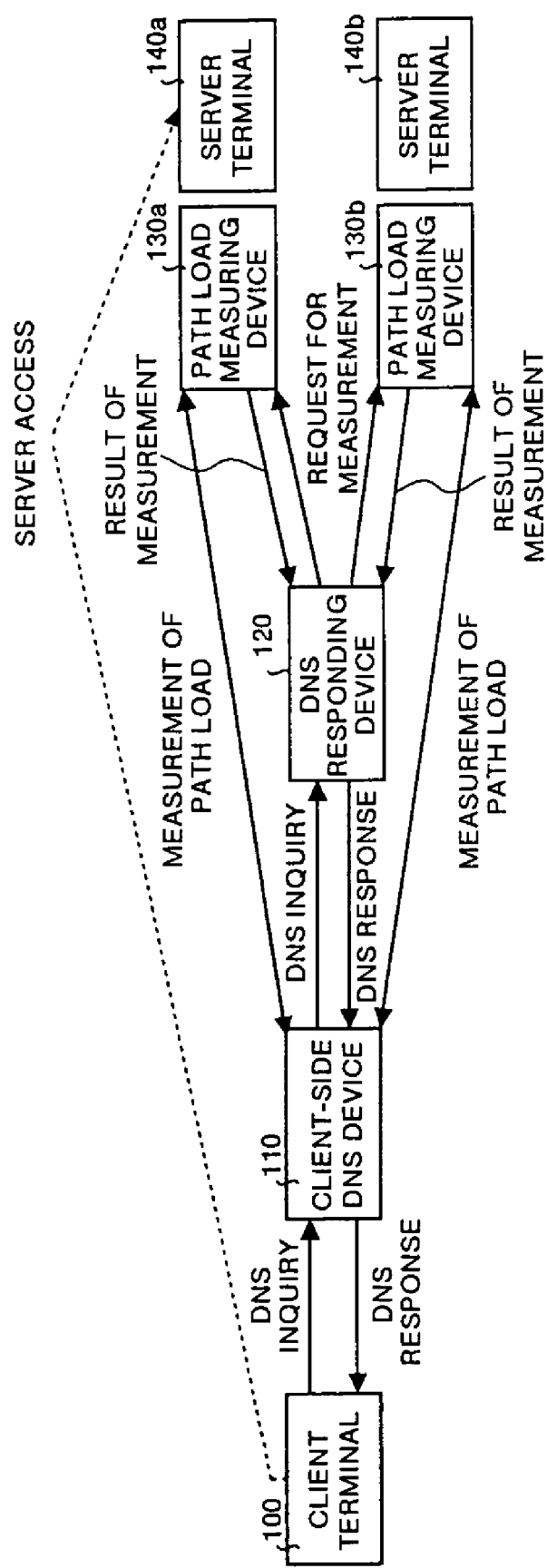
FIG. 1 is a block diagram of a relaying apparatus for use in a network system according to a first embodiment of the present invention.

FIG. 1 shows a relaying apparatus for use in a network system according to a first embodiment of the present invention. As shown in this figure, a client terminal 100, client-side DNS device 110, a DNS responding device 120, path load measuring devices 130*a* and 130*b*, server terminals, 140*a* and 140*b* are connected to a network (such as the Internet) including a plurality of routers not shown herein, and are accessible discretely.

The client terminal 100 is provided at a client (a user) side, and is a terminal which requests a service to the server terminal 140*a* (or server terminal 140*b*) described later by sending the IP packet to a router (not shown). The client terminal 100 also reports, prior to accessing the server terminal 140*a* (or server terminal 140*b*), a representative domain name of the server terminal 140*a* and server terminal 140*b* to the client-side DNS device 110 to acquire an IP address of a server terminal to be accessed (described as a DNS inquiry hereinafter).

The client-side DNS device 110 is a server for realizing the DNS described above, and is connected to the client terminal 100 as well as to a network (not shown). When the client-side DNS device 110 receives a DNS inquiry from the client terminal 100 it makes a DNS inquiry to the DNS responding device 120 present in the upper layer. The client-side DNS device 110 receives an IP address (DNS response) of a server terminal as an object for accessing (server terminal 140*a* or server terminal 140*b*) reported from the DNS responding device 120 and reports this IP address to the client terminal 100.

The server terminal 140*a* is provided at a service provider side, and is a terminal that provides a service to the client terminal 100 in response to a service request from the client terminal 100. Similarly, the server terminal 140*b* is a terminal that provides a service to the client terminal 100 in response to a service request therefrom. It is assumed herein that the server terminal 140*a* and server terminal 140*b* are preset at physically remote positions.

The server terminals 140*a* and 140*b* function as one unit of virtual server terminal when viewed from the client terminal 100. A common domain name (described as a representative domain name hereinafter) are assigned to the server terminals 140*a* and 140*b*, but different IP addresses are given to the server terminals.

The path load measuring device 130*a* is provided at a position adjacent to the server terminal 140*a* (or inside the server terminal 140*b*), and measures an effective band width indicating communication performance in a communication path with the client-side DNS device 110 (or the client terminal 100). The path load measuring device 130*a* measures an effective band width based on such parameters as a round-trip time, a maximum segment size, and an average congestion window size. A specific method of measuring this effective band width is described later. The path load measuring device 130*b* is provided at a position adjacent to the server terminal 140*b* (or inside the server terminal 140*b*), and measures an effective band width indicating communication performance in a communication path up to the client-side DNS device 110 (or client terminal 100) like the path load measuring device 130*a*.

When the DNS responding device 120 receives the DNS inquiry from the client-side DNS device 110 (or the client terminal 100), the DNS responding device 120 requests measurement of an effective band width to the path load measuring devices 130*a* and 130*b*. The DNS device 120 also determines which IP address is to be given to the client terminal 100 according to a result of measurement from each of the path load measuring device 130*a* and path load measuring device 130*b*.

More specifically, the DNS responding device 120 compares the result of measurement by the path load measuring device 130*a* to that by the path load measuring device 130*b*, and selects a result indicating a larger value. For instance, when a result of measurement by the path load measuring device 130*a* is selected, the DNS responding device 120 reports, for routing an IP address of a server terminal 140*a* corresponding to the path load measuring device 130*a* to the client terminal 100, the IP address to the client-side DNS device 110.

Figure 2:
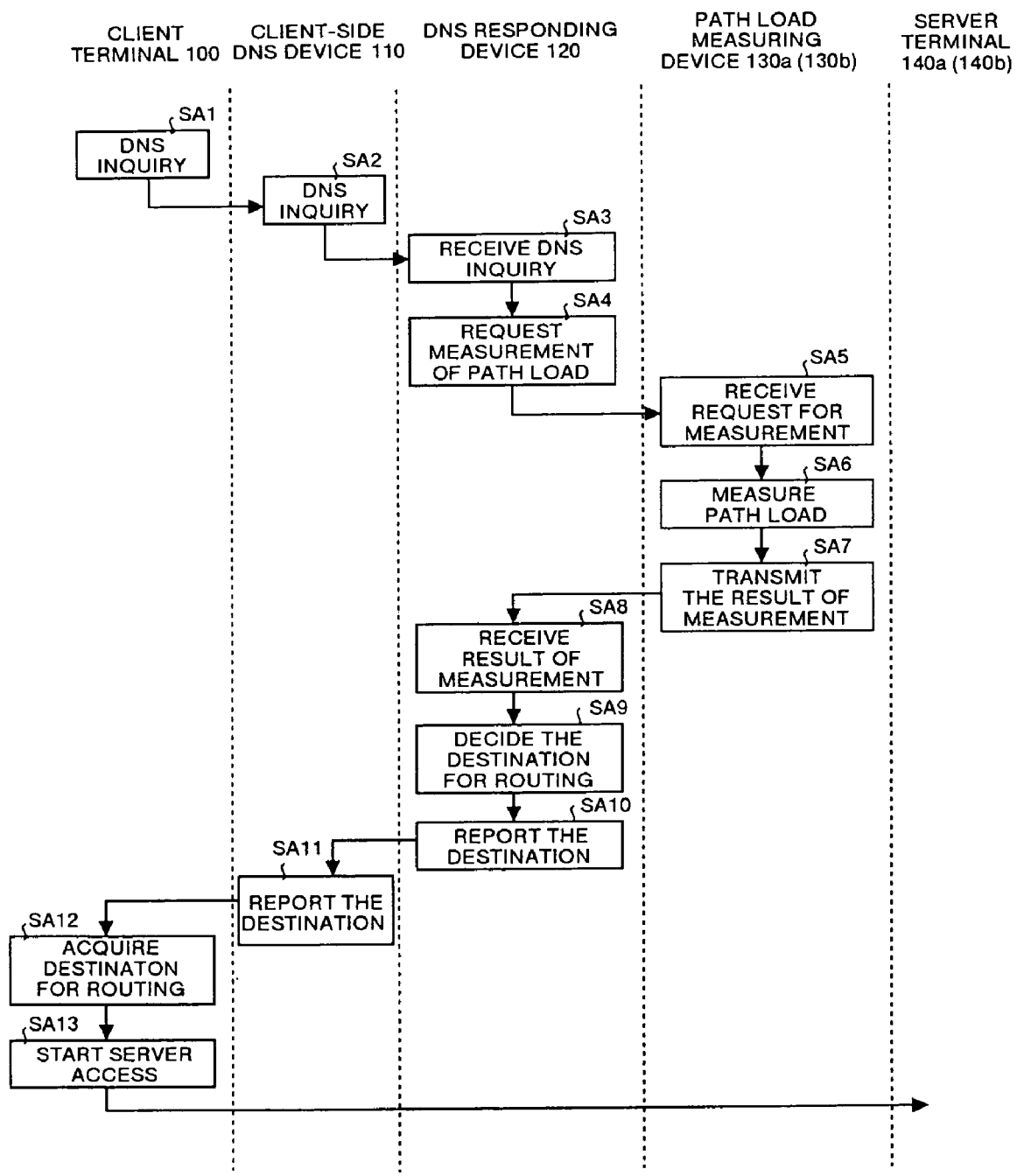
FIG. 2 is a flow chart that explains the operations of the relaying apparatus for use in a network system according to the first embodiment.

Operations of the relaying apparatus for use in a network system according to the first embodiment is described with reference to a flow chart shown in FIG. 2. In FIG. 1, when accessing a virtual server terminal consisting of the server terminal 140*a* and server terminal 140*b*, the client terminal 100 performs the processing in step SA1 shown in FIG. 2 so as to acquire an IP address of a target for access.

In step SA1, the client terminal 100 makes a DNS inquiry by reporting a representative domain name of the virtual server terminal to the client-side DNS device. In response to this operation, the client-side DNS device 110 makes a DNS inquiry to the DNS responding device 120 by reporting the representative domain name to the DNS responding device 120.

In step SA3, the DNS responding device 120 receives the DNS inquiry and performs the processing in step SA4. In step SA4, the DNS responding device 120 requests measurement of a path load, namely an effective band width to both the path load measuring devices 130*a* and 130*b*. When the request for measurement is received in step SA5, the path load measuring device 130*a* and path load measuring device 130*b* execute measurement of an effective band width in step SA6. A method of measuring an effective band width with the path load measuring device 130*a* will be described below.

In step SA6, the path load measuring device 130*a* measures an effective band width in the communication path based on such parameters as a round-trip time in the communication path up to the client-side DNS device 110, a maximum segment size and an average congestion window size.

More specifically, the path load measuring device 130*a* transmits a SYN (SYNchronous idle character) packet to the client-side DNS device 110, and receives an ACK (ACKnowledge character) packet for response transmitted from the client-side DNS device 110. In response to this operation, the path load measuring device 130*a* computes as a round-trip time a time lag between a point of time when the ACK packet is received and a point of time when the SYN packet is transmitted.

The path load measuring device 130*a* then computes a maximum segment size (unit: byte) as described below. In the TCP communications, a packet size is decided according to a maximum transmission unit (MTU) of a router in a communication path. When there are a plurality of routers in a communication path, a maximum value of the maximum communication unit is used as a maximum segment size in the TCP communications. Accordingly, the path load measuring device 130*a* detects an MTC for a router in a communication path with the client-side DNS device 110 as the maximum segment size.

The path load measuring device 130*a* then computes average congestion window size (unit: packet) as described below. In the TCP communications, packet is sent according to the sliding window system under limited output. Namely, the path load measuring device 130*a* sends out a packet to a communication device in the receiving side (client-side DNS device 110) while limiting the output with the sliding window system in a unit of window size, and then confirms according to a communication device in the receiving side (client-side DNS device 110) that packets for a window size have been transferred.

The path load measuring device 130*a* obtains the window size described above by checking a number of packets sent out within one window cycle according to log information of transmitted or received packets. The path load measuring device 130*a* also determines, when an acknowledgment packet from the communication device in the receiving side (client-side DNS device 110) does not arrive within a specified period of time, that the communication path (network) is congested, and adjusts the window size. Adjustment of the window size is executed according to a congestion-evading algorithm.

Namely when an acknowledgment packet does not arrive within a specified period of time, in other words, when packet abortion occurs, the path load measuring device 130*a* reduces a window size to a half thereof, and then increases the window size one by one until packet abortion occurs again. When packet abortion occurs again, the path load measuring device 130*a* again reduces the window size to a half thereof, and repeats the same sequence. The path load measuring device 130*a* computes an average value of window sizes during execution of the congestion-evading algorithm as an average congestion window size.

Then the path load measuring device 130*a* computes an effective band width (transfer rate) in the communication path between the client-side DNS device 110 according to the round-trip time, maximum segment size and average congestion window size. More specifically, the path load measuring device 130a substitutes an effective band width Bw (byte/second), round-trip time RTT (msec), maximum segment size MSS (byte), and average congestion window size W (packet) into the following equation (1) and computes the effective band width. The path load measuring device 130a then performs the processing in step SA7.

$$BW=W \times MSS/RTT \quad (1)$$

On the other hand, the path load measuring device 130b computes a round-trip time in a communication path between the client-side DNS device 110, a maximum segment size, and an average congestion window size in the same manner as the path load measuring device 130a. The path load measuring device 130b then substitutes each computed value into the equation (1) and compute an effective band width in the communication path.

In step SA7, the path load measuring device 130a and path load measuring device 130b transmit results of measurement (effective band width) computed in step SA6 to the DNS responding device 120. In step SA8, the DNS responding device 120 receives both the results of measurement (effective band width). In step SA9, the DNS responding device 120 compares a result of measurement (effective band width) from the path load measuring device 130a to a result of measurement (effective band width) from the path load measuring device 130b, and selects a communication path providing a better result of measurement, namely a communication path with the largest effective band width. It is assumed in the following description that the DNS responding device 120 selects a result of measurement (effective band width) from the path load measuring device 130a.

The DNS responding device 120 then decides the server terminal 140a corresponding to a result of measurement from the path load measuring device 130a as a destination for routing a client request (IP packet) from the client terminal 100. In step SA10, the DNS responding device 120 converts the representative domain name received in step SA3 to an IP address of the server terminal 140a as a destination for routing, and reports the destination for routing by reporting the IP address to the client-side DNS device 110.

In the next step SA11, when the client-side DNS device 110 receives the IP address of the server terminal 140a it reports the IP address to the client terminal 110. Thus in step SA12, the client terminal 100 acquires an IP address of a destination for routing (server terminal 140a). In step SA13, the client terminal 100 accesses the server terminal 140a via a network not shown in the figure, issues a result for service, and receives a service from the server terminal 140a.

It should be noted that, in the relaying apparatus for use in a network system according to the first embodiment, a service request from the client terminal 100 may be routed by the DNS responding device 120 by monitoring operating states of the server terminal 140a and server terminal 140b shown in FIG. 1 with the path load measuring devices 130a and 130b.

As described above, with the relaying apparatus for use in a network system according to the first embodiment described above, a destination for routing a service request from the client terminal 100 is selected according to a reference of a path load reflecting the actual situation, so that distribution of load to the server terminal 140a and server terminal 140b can be executed in an optimal form.

Figure 3:
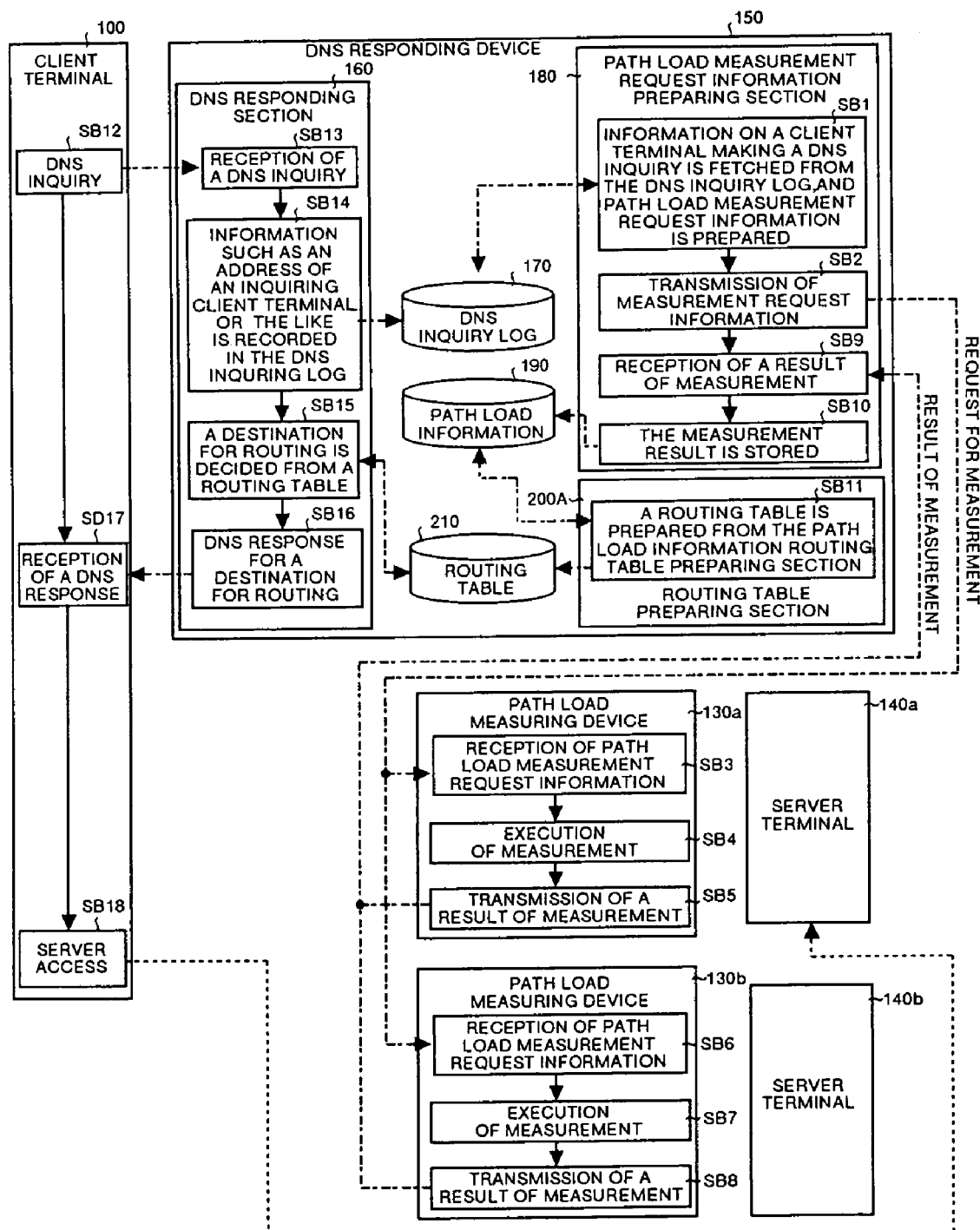
FIG. 3 shows the configuration and the operations of a relaying apparatus according to a second embodiment of the present invention.

FIG. 3 is a view showing configuration and operations of a relaying apparatus for use in a network system according to a second embodiment of the present invention. The same reference numerals are assigned in this figure to components corresponding to those in FIG. 1, and description thereof is omitted herein. In FIG. 3, a DNS responding device 150 is provided in place of the DNS responding device 120 shown in FIG. 1, and the client-side DNS device 110 shown in FIG. 1 is not provided. It should be noted that, although the client-side DNS device 110 is not shown in FIG. 3 for convenience in description, it may be provided between the client terminal 100 and DNS responding device 150 according to the necessity.

The differences between the relaying apparatus for use in a network system according to first and second embodiments is described here. In the relaying apparatus for use in a network system according to the first embodiment, each time a DNS inquiry is made from the client terminal 100 (or the client-side DNA device 110) shown in FIG. 1, measurement of a path load is executed in the path load measuring devices 130a and 130b, and routing (distribution of a work load) is executed according to a result of measurement.

On the contrary, in the relaying apparatus for use in a network system according to the second embodiment, the path load is previously measured by the path load measuring devices 130a and 130b regardless of synchronism with an DNS inquiry from the client terminal 100 shown in FIG. 3. The results of measurement are stored, and when the DNS inquiry is made, routing (distribution of a work load) is made according to the stored result of measurement.

In the DNS responding device 150 shown in FIG. 3, a DNS responding section 160 receives an inquiry for fetching an IP address from the client terminal 100. The DNS responding section 160 reports the IP address for a destination for routing as a DNS response to the client terminal 100 according to a routing table explained later. It should be noted that DNS inquiries are sent to a DNS responding section 160 from, in addition to the client terminal 100, a plurality of client terminal not shown herein. IP addresses are given to the client terminal 100 as well as to the plurality of client terminals not shown herein respectively.

The DNS responding section 160 reads, in addition to a representative domain name, an IP address (IP address of an inquiring client terminal), when receiving an inquiry, from the IP packet. As described above, the representative domain name is a domain name of a virtual server terminal consisting of the server terminals 140a and 140b. The DNS responding section 160 stores an IP address (an IP address of an inquiring client terminal) of the client terminal or other data in a storing section 170 each time a report of a DNS inquiries is received from the client terminal 100 as well as from the plurality of client terminals not shown herein. Accordingly, the IP address and other data are stored as a DNS inquiry log in the storing section 170.

A path load measurement request information preparing section 180 acquires an IP address of, for instance, the client terminal 110 having issued a DNS inquiry in the past by referring the DNS inquiry log stored in the storing section 170, for instance, at a specified time interval not synchronously to a DNS inquiry from the client terminal 100. The path load measurement request information preparing section 180 also prepares path load measurement request information instructing measurement of path loads in communication paths between the client terminal 100 and path load measuring device 130a and between the client terminal 100 and client terminal 130b, and reports the path load measurement request information to the path load measuring devices 130a and 130b.

Further, the path load measurement request information preparing section 180 receives the results of measurement for path loads from the path load measuring devices 130*a* and 130*b* as path load information and stores it in the storing section 190. Namely in this example, data on a path load in a communication path between the client terminal 100 and path load measuring device 130*a* and that between the client terminal 100 and the path load measuring device 130*b* are stored in the storing section 190. It should be noted that the information on path loads stored in the storing section 190 are updated once for a specified period of time.

A routing table preparing section 200A prepares a routing table from path load information for each communication path stored in the storing section 190 and stores the routing table in a storing section 210. More specifically, the routing table preparing section 200A prepares a routing table in which, of information on path loads (effective band widths) corresponding to a plurality of inquiring client terminals, information on a load path indicating the bast value (maximum value) an IP address of the client terminal, and an IP address of a server terminal (server terminal 140*a* and server terminal 140*b*) as a destination of a service request (IP packet) from the client terminal are correlated to each other.

When a DNS inquiry is received from the client terminal 100 (or a plurality of other client terminals not shown herein), this routing table is used to route the service request (IP packet) from the client terminal 100 to a server terminal having the best value for a path load of the server terminals 140*a* and 140*b*.

Operations of a relaying apparatus for use in a network system according to the second embodiment will be described below with reference to a flow chart shown in FIG. 3. It is assumed in the following description that information on a DNS inquiry from the client terminal 100 to the DNS response 150 in the past, namely an IP address of the client terminal 100 has been stored as a DNS inquiry log in the storing section 170 in FIG. 3. When a specified period of time has passed from a certain point of time, the path load measurement request information preparing section 180 performs the processing in step SB1, accesses the storing section 170, make an inquiry on a DNS inquiry log, and acquires information on a client terminal having issued the DNS inquiry. In this case, the information on a client terminal having issued the DNS inquiry is the IP address of the client terminal 100.

The path load measurement request information preparing section 180 then prepares path load measurement request information for instructing measurement of path loads in communication paths between the client terminal 100 and the path load measuring devices 130*a* and 130*b*. In step SB2, the path load measurement request information preparing section 180 transmits the prepared path load measurement request information to the path load measuring devices 130*a* and 130*b*. With this operation, in step SB3, the path load measuring device 130*a* receives the path load measurement request information.

In step SB4, the path load measuring device 130*a* measures a round-trip time, a maximum segment size, and an average congestion window size in a communication path between the client terminal 100 with a method like that in the first embodiment described above, computes an effective band width in the communication path from the equation (1). In step SB5, the path load measuring device 130*a* sends the effective band width to the path load measurement request information preparing section 180.

On the other hand, in step SB6, the path load measuring device 130*b* receives the path load measurement request information. In step SB7, the path load measuring device 130*b* measures a round-trip time, a maximum segment size, and an average congestion window size in a communication path between the client terminal 100 in the same manner as the path load measuring device 130*a*, computes an effective band width in a communication path from the equation (1). In step SB8, the path load measuring device 130*b* transmits the effective band width as a result of measurement for a path load to the path load measurement request information preparing section 180.

In step SB9, the path load measurement request information preparing section 180 receives results (effective band widths) of measurement on the path loads from the path load measuring devices 130*a* and 130*b*. In step SB10, the path load measurement request information preparing section 180 stores the received results of measurement of path loads (effective band widths) as path load information in the storing section 190. When the path load information is stored in the storing section 190, in step SB11, the routing table preparing section 200A reads out the path load information from the storing section 190, and prepares a routing table according to the path load information. The path load information includes data on a effective band width between the client terminal 100 and the path load measuring devices 130*a* and 130*b*.

More specifically, the routing table preparing section 200A compares the two effective band widths to each other, and selects an effective band width with the best (maximum) value. It is assumed in the following description that an effective band width between the client terminal 100 and path load measuring device 130*a* is selected. The routing table preparing section 200A then stores the selected effective band width, the IP address of the server terminal 140 corresponding to the effective band width, and the IP address of the client terminal 100 in a correlated form as a routing table in a storing section 210.

Thus, the routing table is updated. The path load measurement request information preparing section 180, path load measuring devices 130*a* and 130*b*, and routing table 200A then execute operations associated with measurement described above at a prespecified time interval.

In step SB12, when a DNS inquiry is made from the client terminal 100 to the DNS responding section 160 in the DNS responding device 150, a representative domain name and an IP address of an inquiring client terminal (IP address of the client terminal 100) are reported from the client terminal 100 to the DNS responding section 160. In step SB13, when the DNS responding section 160 receives the DNS inquiry, the DNS responding section 160 performs the processing in step SB14. In step SB14, the DNS responding section 160 adds an IP address and a representative domain name of the client terminal 100 in a DNS inquiry of in the storing section 170.

In step SB15, a destination for routing a service request (IP packet) from the client terminal 100 is decided based on the routing table stored in the storing section 210. The routing table consists of the best effective band width, IP address of the server terminal 140*a* corresponding to the effective band width, and IP address of the client terminal 100 in a correlated form. Accordingly, the DNS responding section 160 decides the server terminal 140*a* as a destination for routing. In step SB16, the DNS responding section 160 reports the IP address of the server terminal 140*a* as a DNS response to the client terminal 100.

In step SB17, when the IP address of the server terminal 140*a* is received, the client terminal 100 acquires an IP address of a destination for routing (server terminal 140*a*).

In step SB18, the client terminal 100 accesses the server terminal 140a via a network not shown herein to request a service, and receives the service from the server terminal 140a.

As described above, with the relaying apparatus for use in a network system according to the second embodiment, results of measurement (path loads) by the path load measuring devices 130a and 130b are previously stored in the storing section 190. When a service request (DNS inquiry) is made from the client terminal 100, the service request is routed immediately without executing real time measurement by the path load measuring devices 130a and 130b. Accordingly, with the relaying apparatus for use in a network system according to the second embodiment, distribution of a work load in the server terminals 140a and 140b can quickly be executed in the optimal form.

Figure 4:
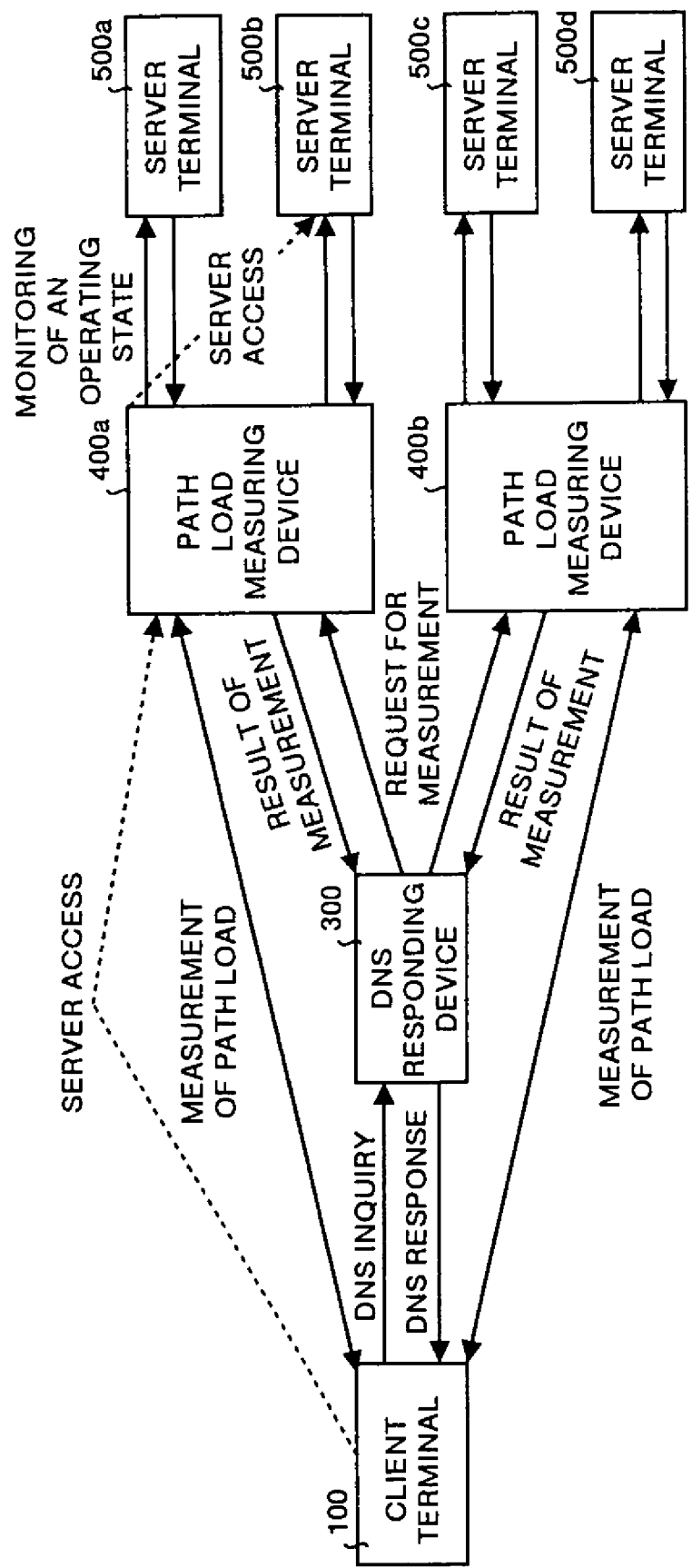
FIG. 4 shows the general configuration of a relaying apparatus for use in a network system according to a third embodiment.

FIG. 4 is a block diagram showing configuration of a relaying apparatus for use in a network system according to a third embodiment of the present invention. The same reference numerals are assigned in this figure to components corresponding to those in FIG. 1. In this figure, a server terminals 500a, 500b, 500c, and 500d are provided in the service provider side respectively, and these terminals provide a service to the client terminal 100 in response to a service request from the client terminal 100. The server terminals 500a to 500d apparently function as one unit of virtual server terminal when viewed from the client terminal 100. A representative domain name is given to these server terminals 500a to 500d but each of them have a separate IP address.

A path load measuring device 400a is provided at a position adjacent to the server terminal 500a and server terminal 500b (or inside the server terminal 500a and server terminal 500b), and has an IP address assigned thereto. The path load measuring device 400a measures, like the path load measuring device 130a (refer to FIG. 1), an effective band width (path load) indicating a communication performance in a communication path between the client terminal 100. More specifically, the path load measuring device 400a measures an effective band width according to such parameters as described above including a round-trip time, maximum segment size, average congestion window size, packet abortion ratio, and packet abortion event ratio.

The path load measuring device 400a has a function of monitoring operating state of the server terminal 500a and server terminal 500b, and acquires a result of monitoring as information on the operating state. Herein the information concerning the operating state include the following data.

(A) Information as to whether the server terminal is being operated or not (confirmed by making using of ping)

(B) Information as to whether the server terminal provides is providing a service or not (confirmed by opening a service provision port (#80 in a case of http))

(C) Following data (a) to (e) concerning a work load to the server terminal
  (a) A number of connecting sessions for the server
  (b) A number of simulated sessions for the server (A number of sessions simulatedly prepared for a communication protocol not having a session such as UDP
  (c) A number of SYN (request for connection) re-transmissions per unit time
  (d) A response time for a service and connection
  (e) Machine load (CPU, I/O load factor using an agent)

(D) Operation schedule in the server

The path load measuring device 400b is provided at a position adjacent to the server terminal 500c and server terminal 500d (or inside the server terminal 500c and server terminal 500d), and has a specific IP address assigned thereto. The path load measuring device 400b measures, like the path load measuring device 400a, an effective band width (path load) indicating a communication performance in a communication path between the client terminal 100. The path load measuring device 400b also has, like the path load measuring device 400a, a function of monitoring operating states of the server terminal 500c and server terminal 500d, and acquires a result of monitoring as information on an operating state.

When the DNS responding device 300 receives a DNS inquiry from the client terminal 100, it requests measurement of a path load (effective band width) to the path load measuring devices 400a and 400b. The DNS responding device 300 also determines as to which of IP addresses of the path load measuring devices 400a and 400b is to be routed to the client terminal 100 according to results of measurement from the path load measuring devices 400a and 400b.

More specifically, the DNS responding device 300 compares a result of measurement by the path load measuring device 400a to that by the path load measuring device 400b, and selects the one that has a larger value. For instance, when a result of measurement by the path load measuring device 400a is selected, the DNS responding device 300 reports the IP address of the path load measuring device 400a to the client terminal 100. Namely, the DNS responding device 300 executes an operation for routing the IP packet (service request) from the client terminal 100 to any of the path load measuring devices 400a and 400b as primary routing.

The path load measuring device 400a then executes secondary routing by routing the IP packet (service request) having been subjected to primary routing by the DNS responding device 300, by checking operating states of the server terminals 500a and 500b, to a server terminal that is in the best operating state. For this secondary routing, there is employed a method in which a destination address of an IP header is converted to an IP address of a server terminal as a destination for routing by the NAT (Network Address Translator), or a method in which the destination address is replaced with a MAC (Media Access Control) address for a server terminal as a destination for routing.

Similarly the path load measuring device 400b executes secondary routing by routing the IP packet (service request) having been subjected to primary routing by the DNS responding device 300, by checking operating states of the server terminals 500c and 500d, to a server terminal that is in the best operating state.

Configuration of the DNS responding device 300 shown in FIG. 4 will be explained while referring to FIG. 5. In this figure, the same reference numerals are assigned to components corresponding to those in FIG. 3 and FIG. 4 and detailed description thereof is omitted herein. In the responding device 300 shown in FIG. 5, a routing table preparing section 200B is provided in place of the routing table preparing section 200A shown in FIG. 3.

This routing table preparing section 200B prepares a routing table from path load information for each communication path described above and stored in the storing section 190, and has the routing table stored in a storing section 210. More specifically, the routing table preparing section 200B prepares a routing table in which, of path load information (effective band width) corresponding to a plurality of inquiring client terminals, information on work load in a path showing the best value (maximum value), an IP address of the client terminal, and a path load measuring device as a destination for routing an IP packet (service request) from the client terminal (path load measuring devices 400*a* or 400*b*) are stored in correlation to each other.

Namely, when a DNS inquiry is made from the client terminal 100 this routing table is used for routing the IP packet from the client terminal 100 to any one of the path load measuring devices 400*a* and 400*b* showing the best value.

Figure 6:
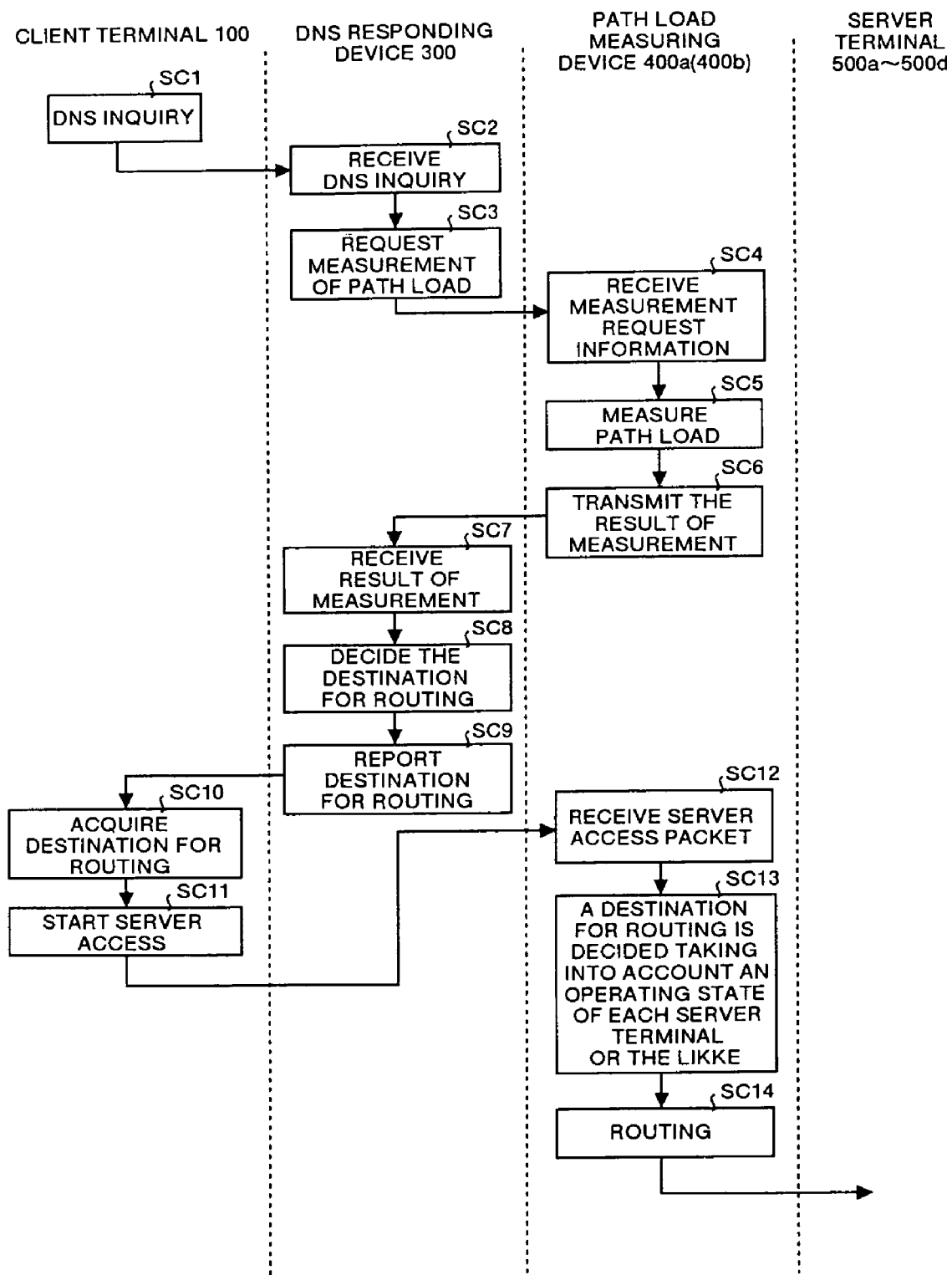
FIG. 6 is a flow chart that explains the general operations of the relaying apparatus for use in a network system according to the third embodiment.

An outline of operations of the relaying apparatus for use in a network system according to the third embodiment is described below with reference to the flow chart shown in FIG. 6. In FIG. 4, when accessing a virtual terminal comprising the server terminals 500*a* to 500*d*, the client terminal 100 performs the processing in step SC1 shown in FIG. 6. In step SC1, the client terminal 100 makes a DNS inquiry by reporting a representative domain name of the virtual server terminal to the DNS responding device 300. When the DNS inquiry is required, in step SC3 the DNS responding device 300 requests measurement of path loads, namely effective band widths to both of the path load measuring devices 400*a* and 400*b*.

In step SC4, the path load measuring devices 400*a* and 400*b* receive the request for measurement. In step SC5, the path load measuring devices 400*a* and 400*b* measure the effective band width like in the step SA6 described above (Refer to FIG. 2). Herein the result of measurement includes data on an effective band width in a communication path between the path load measuring devices 400*a* and 400*b* and the client terminal 100.

In step SC6, the path load measuring devices 400*a* and 400*b* transmit results of measurement computed in step SC5 to the DNS responding device 300. With this, in step SC7, the DNS responding device 300 receives the two results of measurement (effective bandwidths). In step SC8, the DNS responding device 300 compares a result of measurement (effective band width from the path load measuring device 400*a* to that from the path load measuring device 400*b*, and selects the one having a larger effective band width. It is assumed in the following description that the DNS responding device 300 selects a result of measurement from the path load measuring device 400*a*.

The DNS responding device 300 then decides the path load measuring device 400*a* corresponding to a result of measurement from the path load measuring device 400*a* as a destination for routing the IP packet (service request) from the client terminal 100. In the next step SC9, the DNS responding device 300 converts the representative domain name received in step SC3 to an IP address of the path load measuring device 400*a* as a destination for primary routing, and issues a response concerning routing by reporting to the IP address to the client terminal 100.

Then in step SC10, when an IP address of the path load measuring device 400*a* is received, the client terminal 100 fetches the IP address of a destination for routing (path load measuring device 400*a*). In the next step SC11, the client terminal 100 accesses the path load measuring device 400*a* via a network not shown herein, and outputs an IP packet.

Accordingly, the path load measuring device 400*a* receives the IP packet. In the next step SC13, the path load measuring device 400*a* selects either one in the best operating state of the server terminal 500*a* and server terminal 500*b* as a destination for secondary routing taking into account operating states of the server terminal 500*a* and server terminal 500*b*. It is assumed in the following description that the server terminal 500*b* is selected as a destination for secondary routing In step SC14, the path load measuring device 400*a* routes the IP packet to the server terminal 500*b* decided in step SC13. With this, the client terminal 100 receives a service from the server terminal 500*b*.

Figure 5:
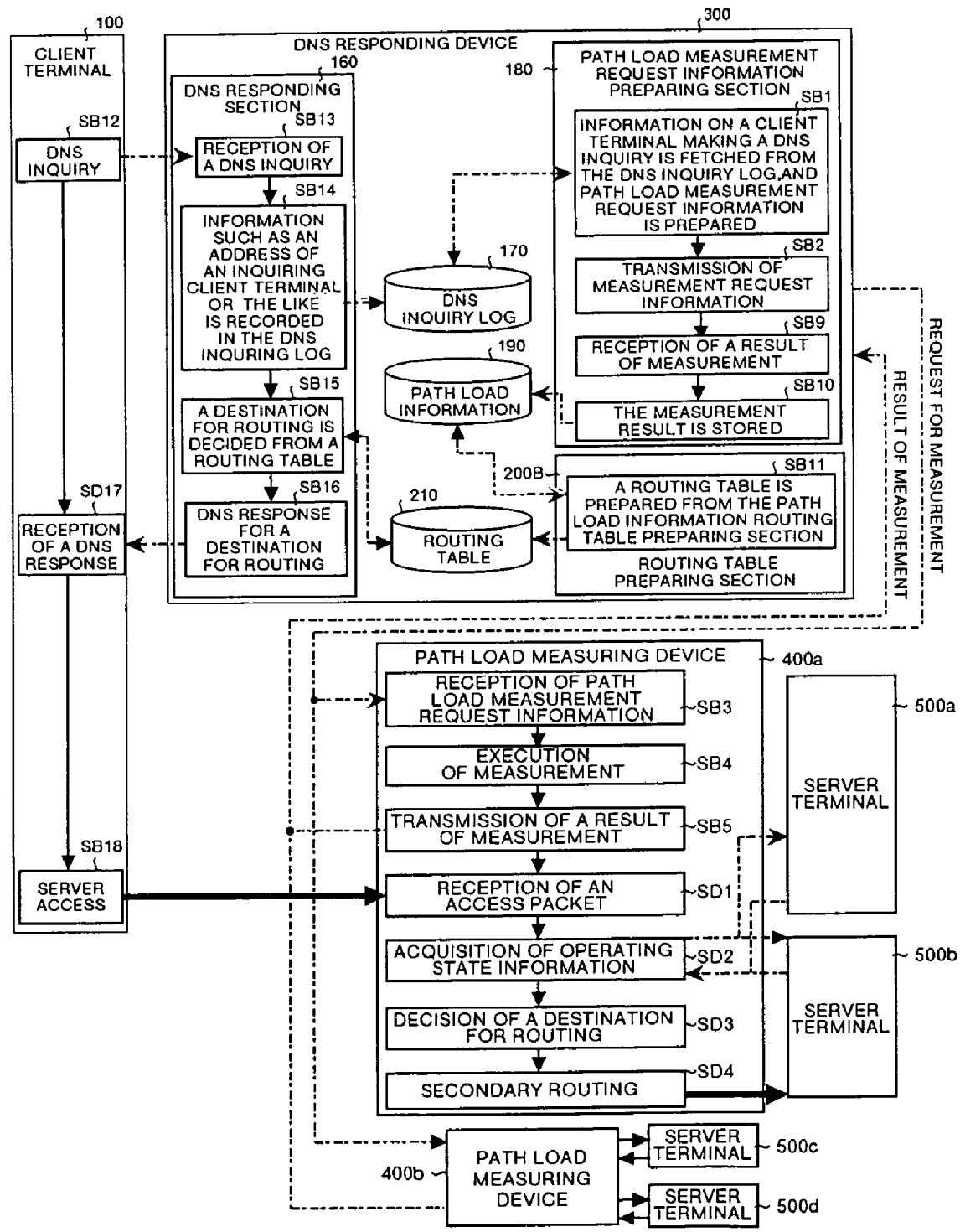
FIG. 5 shows the configuration and the operations of the relaying apparatus for use in a network system according to the third embodiment.

Detailed operations of a relaying apparatus for use in a network system according to a third embodiment with reference to FIG. 5. In steps SB1 to SC18 shown in FIG. 5, operations in step SB1 to step SB5, step SB9, step SB10, step SB12 to step SB14 are the same as those in step SB1 to step SB5, step SB9, step SB10, and steps SB12 to SB14, so that detailed description thereof is omitted herein. Therefore, in the following that are steps different from those shown in FIG. 3 are mainly explained. Namely only the step SB11, step SB15 to step SB17, and step SD1 to step SD4 are explained.

Assuming that information on path loads is stored in the storing section 190 shown in FIG. 5, in step SB11, the routing table preparing section 200B reads out the path load information from the storing section 190, and prepares a routing table according to the path load information. Herein the path load information includes data on an effective band width between the client terminal 100 and path load measuring device 400*a*, and that between the client terminal 100 and path load measuring device 400*b*.

More specifically, the routing table preparing section 200B compares the two effective band widths to each other, and selects the best (maximum) effective band width. It is assumed in the following description that an effective band width between the client terminal 100 and path load measuring device 400*a* is selected. The routing table preparing section 200B then stores a routing table, which is a table in which an IP address of the path load measuring device 400*a* corresponding to the effective band width and an IP address of the client terminal 100 are stored in a correlated form, in the storing section 210.

In step SB12, when a DNS inquiry is made from the client terminal 100 to the DNS responding section 160 in the DNS responding device 300, the representative domain name and an IP address (IP address of the client terminal 100) of the inquiring client terminal are reported to the DNS responding section 160. In the next step SB13, the DNS responding section 160 receives the DNS inquiry. In the next step SB14, the DNS responding section 160 adds the IP address and a representative domain name of the client terminal 100 to an DND inquiry log in the storing section 170.

In step SB15, the DNS responding section 160 decides a destination for primary routing of the IP packet (service request) from the client terminal 100 according to a routing table stored in the storing section 210. The routing table comprises the best effective band width and an IP address of the path load measuring device 400*a* corresponding to the effective band width in a correlated form. Accordingly, the DNS responding section 160 decides the path load measuring device 400*a* as a destination for primary routing. In the next step SB16, the DNS responding section 160 reports the IP address of the path load measuring device 400*a* as a DNS response to the client terminal 100.

In step SB17, when the IP address of the path load measuring device 400*a* is received, the client terminal 100 acquires an IP address of a destination for routing (path load measuring device 400*a*). In the next step SB18, the client terminal 100 accesses the path load measuring device 400*a* via a network not shown in this figure.

Accordingly, in step SD1, the path load measuring device 400*a* receives an IP packet. In step SD2, the path load measuring device 400*a* acquires information concerning operating states of the server terminals 500*a* and 500*b*. In step SD3, the path load measuring device 400*a* decides either one in the best operating state of the server terminal 500a and server terminal 500b as a secondary destination of an IP packet. It is assumed in the following description that the server terminal 500b is decided as a secondary destination for routing. In the next step SD4, the path load measuring device 400a routes the IP packet to the server terminal 500b decided in step SD3. Thus, the client terminal 100 receives a service from the server terminal 500b.

As described above, with the relaying apparatus for use in a network system according to the third embodiment described above, after a primary destination for routing a service request is selected, and one of the server terminals 500a to 500d is selected further taking into account operating states of these server terminals. Therefore, work load can optimally be distributed among the server terminals 500a to 500d.

Figure 7:
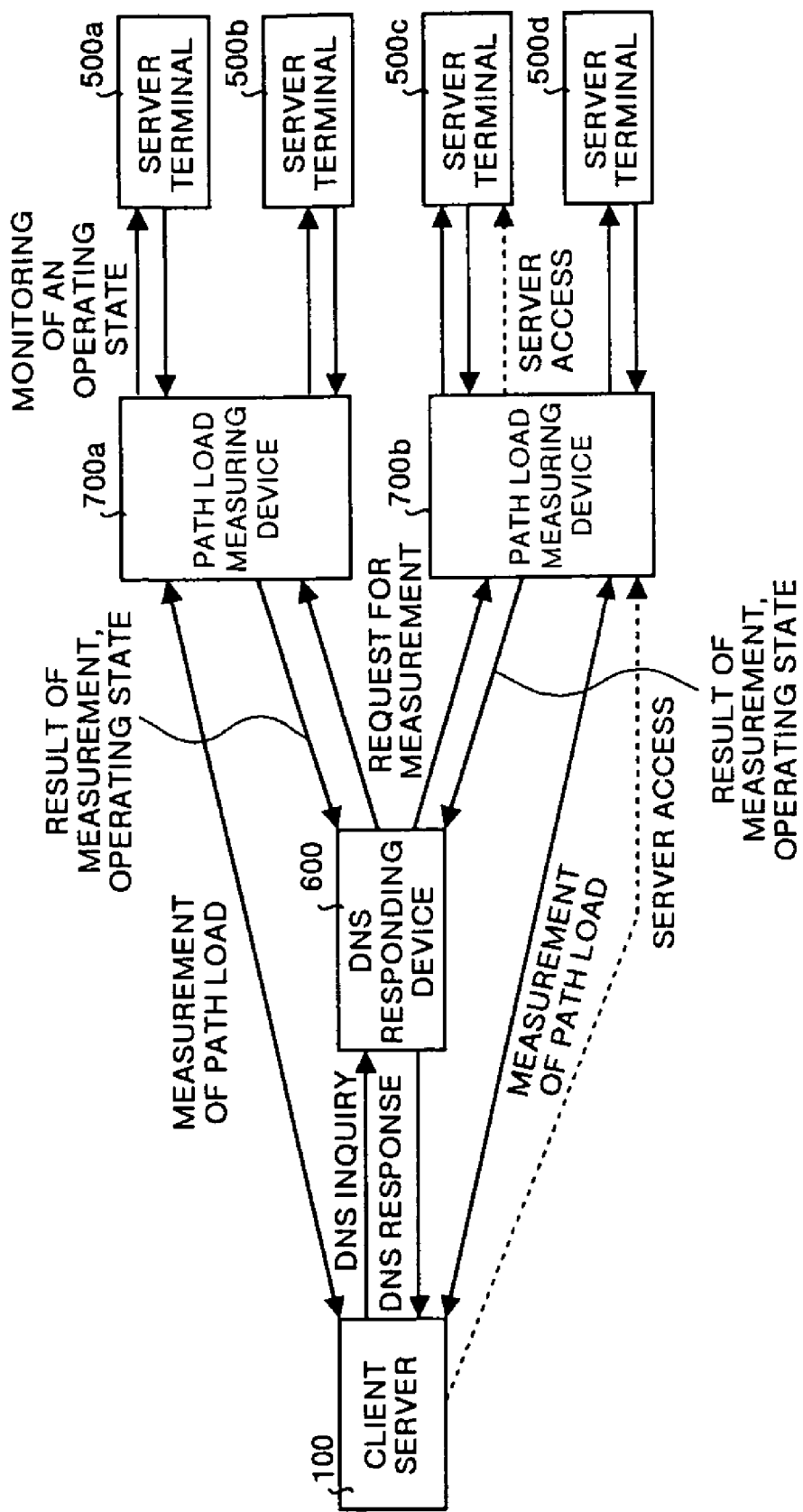
FIG. 7 shows the general configuration of a relaying apparatus for use in a network system according to a fourth embodiment of the present invention.

FIG. 7 is a block diagram showing configuration of a relaying apparatus for use in a network system according to a fourth embodiment of the present invention. In this figure, the same reference numerals are assigned to components corresponding to those in FIG. 4, and detailed description thereof is omitted herein. In FIG. 7, in place of the DNS responding device 300, path load measuring device 400a, and path load measuring device 400b, a DNS responding device 600, path load measuring device 700a, and path load measuring device 700b are respectively provided.

The path load measuring device 700a shown in FIG. 7 is provided at a position adjacent to the server terminal 500a and server terminal 500b (or inside the server terminals 500a and 500b), and has an IP address assigned thereto. This path load measuring device 700a measures, like the path load measuring device 400a described above (Refer to FIG. 4), an effective band width (path load) indicating a communication performance in a communication path with the client terminal 100 in the same manner as the path load measuring device 400a (Refer to FIG. 4) described above.

The path load measuring device 700a has a function of monitoring an operating state of each of the server terminals 500a and 500b like the path load measuring device 400a described above. Further, the path load measuring device 700a reports information concerning this operating state to the DNS responding device 600.

The path load measuring device 700b is provided at a position adjacent to the server terminals 500c and 500b (or inside the server terminals 500c and 500d), and has an IP address assigned thereto. This path load measuring device 700b measures an effective band width indicating a communication performance in a communication path with the client terminal 100 in the same manner as the path load measuring device 400a (Refer to FIG. 4) described above. The path load measuring device 700b also has a function of monitoring an operating state of each of the server terminals 500c and 500d in the same manner as the path load measuring device 700a, and acquires a result of monitoring as information concerning an operating state. Further, the path load measuring device 700b reports the information concerning this operating state to the DNS responding device 600.

When the DNS responding device 600 receives a DNS inquiry from the client terminal 100, the DNS responding device 600 issues a result for measurement of a path load to the path load measuring devices 700a and 700b. The DNS responding device 600 also routes either one of the IP address of the path load measuring devices 700a and 700b according to results of measurement from the path load measuring device 700a and path load measuring device 700b taking into account the operating states thereof as described above.

More specifically, the DNS responding device 600 compares a result of measurement by the path load measuring device 700a to that by the path load measuring device 700b, and selects the one with a larger value. Further, the DNS responding device 600 determines as to whether the selection is reasonable or not taking into account the operating state of the path load measuring device corresponding to the result of measurement selected above. For instance, let us consider that the DNS responding device 600 has selected a result of measurement from the path load measuring device 700a. However, if the operating state corresponding to a result of measurement from the path load measuring device 700a indicates that both the server terminals 500a and 500b are in the down, then the DNS responding device 600 selects a result of measurement from the path load measuring device 700b in place of the result of measurement from the path load measuring device 700a.

When a result of measurement from the path load measuring device 700b is selected, the DNS responding device 600 reports the IP address of the path load measuring device 700b to the client terminal 100. Namely, the DNS responding device 600 routes the IP packet (service request) from the client terminal 100 to either one of the path load measuring devices 700a and 700b as primary routing taking into account both the result of measurement and the operating state.

The path load measuring device 700a executes secondary routing for routing the IP packet (service request) having been subjected to primary routing by the DNS responding device 600 to a server terminal in the best operating state. Similarly the path load measuring device 700b executes secondary routing for routing the IP packet (service request) having been subjected to primary routing by the DNS responding device 600 to a server terminal in the best operating condition according to operating states of the server terminals 500a and 500d.

Configuration of the DNS responding device 600 and that of the path load measuring device 700b shown in FIG. 7 is explained with reference to FIG. 8. In this figure, the same reference numerals are assigned to components corresponding to those in FIG. 5.

Figure 8:
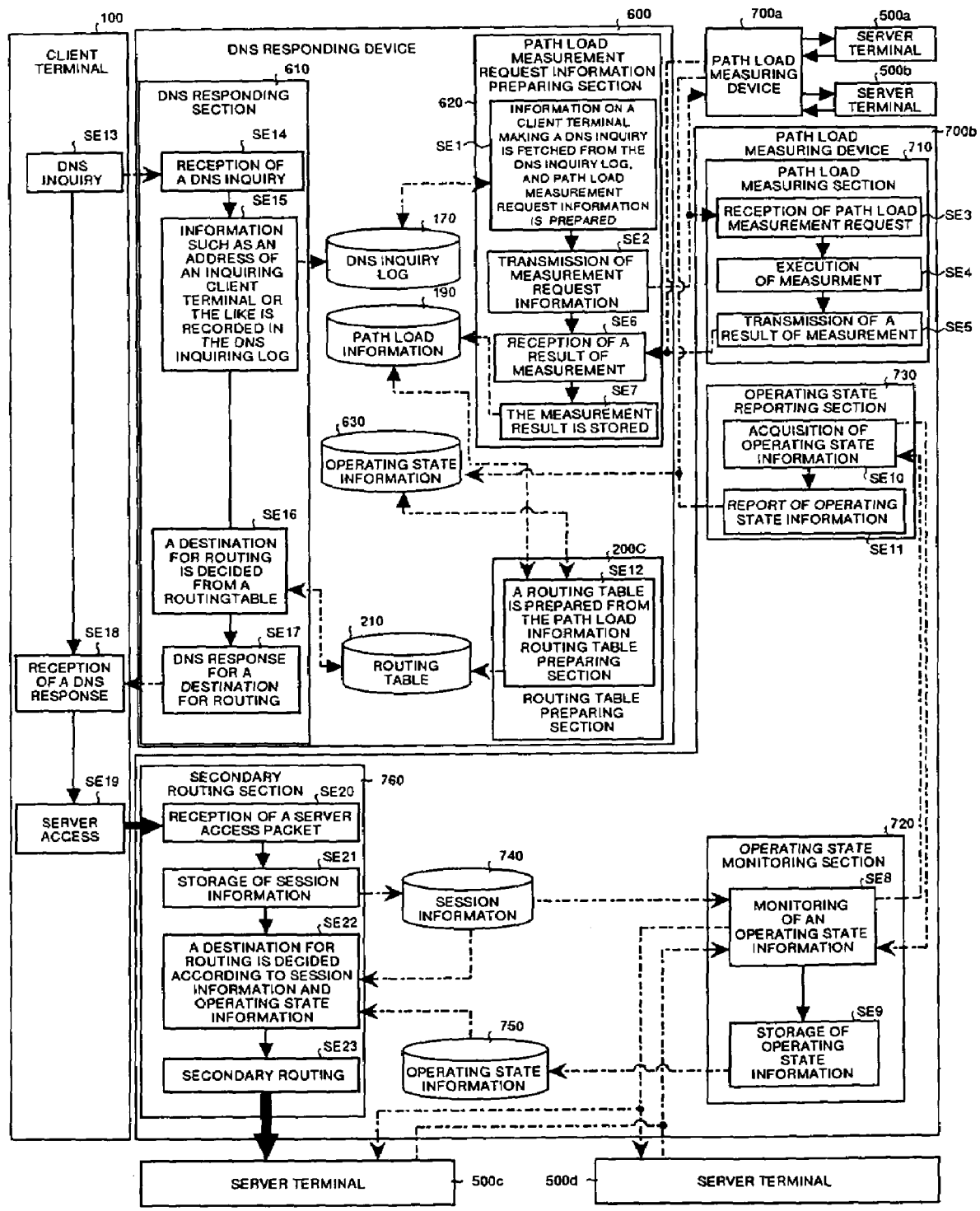
FIG. 8 shows the configuration and the operations of the relaying apparatus for use in a network system according to the fourth embodiment.
Figure 9:
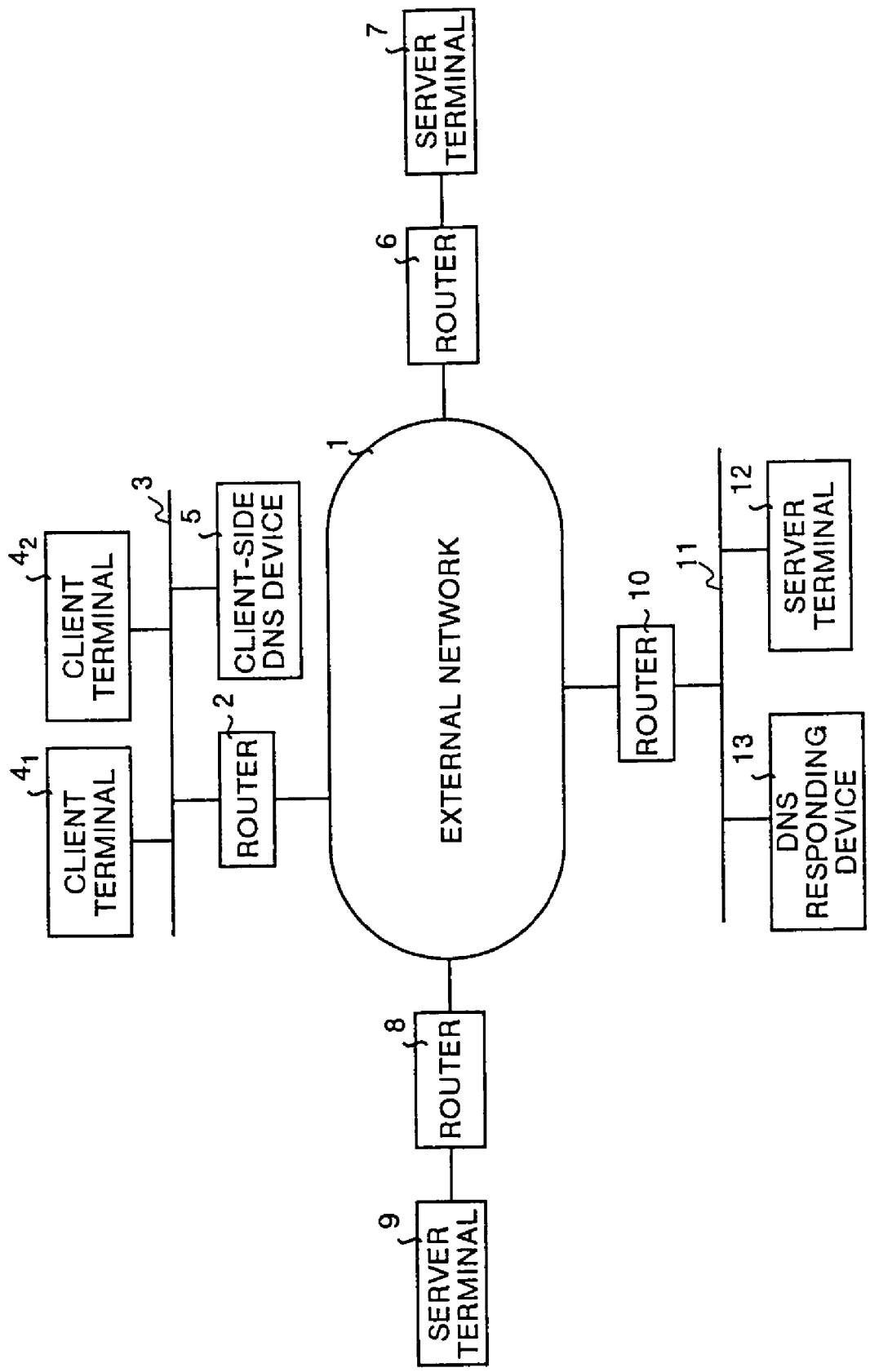
FIG. 9 is a block diagram of a replaying apparatus for use in a network system based on the conventional technology.

In the DNS responding device 600 shown in FIG. 8, a DNS responding section 610, a path load measurement request information preparing section 620, and a routing table 200C are provided in place of the DNS responding device 160, path load measurement request information preparing section 180, and routing table preparing section 200B shown in FIG. 5. Further, a storing section 630 is provided in the DNS responding device 600 anew.

In the DNS responding device 600 shown in FIG. 8, the DNS responding section 610 receives an inquiry for acquiring an IP address from the client terminal 100, and reports an IP address of a destination for primary routing as a DNS response according to the routing table described later to the client terminal 100.

It should be noted that there are inquiries from a plurality of DNS responses not shown herein in addition to that from the client terminal 100. Also IP addresses are assigned to the client terminal 100 as well as to the plurality of client terminals not shown respectively.

Each time the DNS responding section 610 receives a DNS inquiry from any of the client terminal 100 and the plurality of client terminals not shown, the DNS responding section 610 has an IP address of the client terminal (an IP address of an inquiring client terminal) stored as DNS inquiry log in the storing section 170.

The path load measurement request information preparing section 620 prepares, like the path load measurement request information preparing section 180 (Refer to FIG. 5) described above, path load measurement request information for instructing measurement of path loads in communication paths between the client terminal 100 and path load measuring devices 700a and 700b.

Further, the path load measurement request information preparing section 620 stores the results of measurement reported from the path load measuring devices 700a and 700b as path load information in the storing section 190. In the storing section 630, information on operating states of the path load measuring devices 700a and 700b is stored. The routing table preparing section 200C prepares a routing table from the path load information for each path load stored in the storing section 190 as well as from the operating state information stored in the storing section 630, and stores this routing table in the storing section 210.

More specifically, the routing table preparing section 200C prepares a routing table in which, of the path load information (information on effective band widths) corresponding to a plurality of inquiring client terminals, an IP address of a client terminal corresponding to path load information indicating the best (maximum) value and an IP address of a path load measuring device (path load measuring device 700a or 700b) as a destination for routing an IP packet (service request) from the client terminal are stored in correlation to each other).

Let us consider that a result of measurement from the path load measuring device 700a is selected. However, if information on the operating state corresponding to the path load measuring device 700a indicates that both the server terminals 500a and 500b are down, then a result of measurement from the path load measuring device 700 is selected from the routing table in place of that from the path load measuring device 700a.

Namely the routing table is used, when an DNS inquiry is made from the client terminal 100, to route an IP packet (service request) from the client terminal 100 to either one of the path load measuring devices 700a and 700b taking into account path loads and operating states thereof. When information on a request for measurement is reported from the path load measurement request information preparing section 620, a path load measuring section 710 in the path load measuring device 700b measures a path load (effective band width) of a communication path with the client terminal 100 like the path load measuring device 400b (Refer to FIG. 5). The path load measuring section 710 also reports a result of measurement to the path load measurement request information preparing section 620.

An operating state monitoring section 720 reports the operating state to an operating state reporting section 730 by monitoring operating states of the server terminals 500a and 500c according to session information stored in a storing section 740. The operating state monitoring section 720 stores the information on operating state in a storing section 750.

The operating state reporting section 730 receives information on an operating state from the operating state monitoring section 720, and stores the report (operating state information) in the storing section 630 of the DNS responding section 600. A secondary routing section 760 executes secondary routing by routing the IP packet (service request) having been subjected to primary routing by the DNS responding device 600 to a server terminal in the best operating state (server terminal 500c or 500d) according to the operating state and session state thereof).

Operations of the relaying apparatus for use in a network system according to the fourth embodiment are explained with reference to the flow chart shown in FIG. 8. It is assumed in the following description that information indicating occurrence of a DNS inquiry form the client terminal 100 to the DNS responding device 600 in the past, namely an IP address of the client terminal 100 is already stored as DNS inquiry log in the storing section 170 shown in FIG. 8.

Assuming that a specified period of time has passed from a certain point of time in this state, the path load measurement request information preparing section 620 performs the processing in step SE1, at first accesses the storing section 170, checks the DNS inquiry log, acquires the information on a client terminal having issued the DNS inquiry, prepares path load measurement request information. In the next step SE2, the path load measurement request information preparing section 620 transmits the prepared path load measurement request information to the path load measuring devices 700a and 700b. Operations of the path load measuring device 700b are explained here, but it should be noted that the path load measuring device 700a functions similarly.

In step SE3, the path load measuring device 700b receives the path load measurement request information. In the next step SE4, the path load measuring device 700b measures a path load (an effective band width) in a communication path with the client terminal 100 using the technique described above. In the next step SE5, the path load measuring device 700b transmits the effective band width as a result of measurement of path load to the path load measurement request information preparing section 620.

The path load measuring device 700a also measures the path load (effective band width) in a communication path with the client terminal 100, and the result of is transmitted to the path load measurement request information preparing section 620.

In step SE6, the path load measurement request information preparing section 620 receives the results of measurement of path loads (effective band widths) from the path load measuring devices 700a and 700b. In the next step SE7, the path load measurement request information preparing section 620 stores the received results of measurement of path loads (effective band width) as path load information in the storing section 190.

In step SE8, the operating state monitoring section 720 in the path load measuring device 700b monitors operating states of the server terminals 500c and 500d, and reports the result as operating state information to the operating state reporting section 730. In the next step SE9 for monitoring, the operating state monitoring section 720 stores the operating state information in the storing section 750. in step SE10 The operating state reporting section 730 acquires operating state information in step SE10, and in step SE11 stores the operating state information in the storing section 630 in the DNS responding device 600.

It should be noted that, also in the path load measuring device 700a, an operation for monitoring operating states of the server terminals 500a and 500b and an operation for storing the operating state information in the storing state 630 of the DNS responding device 600 are executed.

When the path load information and operating state information are stored in the storing section 190 and storing section 630 respectively, in step SE12, the routing table preparing section 200C reads out the path load information and operating state information from the storing section 190 and storing section 630 respectively, and prepares a routing table according to the path load information and operating state information.

The path load information includes data on an effective band width between the client terminal 100 and path load measuring devices 700a and 700b. On the other hand, the operating state information includes data indicating that both the server terminals 500a and 500d down, and data indicating that both the server terminals 500c and 500d are working.

More specifically, the routing table preparing section 200C compares the two effective band widths to each other and selects one with the base (maximum) value. It is assumed in the following description that an effective band width between the client terminal 100 and path load measuring device 700a is selected. According to the operating state from the path load measuring device 700a corresponding to the selected result of measurement (effective bandwidth) it is determined whether the selection above is reasonable or not.

It is determined here that the selection is not reasonable because both the server terminals 500a and 500b corresponding to the path load measuring device 700a are down. Therefore, the routing table preparing section 200C selects the result of measurement from the path load measuring device 700b in place of that from the path load measuring device 700a.

Accordingly, the routing table preparing section 200C stores the effective band width corresponding to the path load measuring device 700b, IP address of the path load measuring device 700b corresponding to the effective band width, and IP address of the client terminal 100 in a correlated form as a routing table in the storing section 210.

In step SE13, when a DNS inquiry is made from the client terminal 100 to the DNS responding section 610 in the DNS responding device 600, representative domain name and IP address of the inquiring client terminal (IP address of the client terminal 100) are reported to the DNS responding section 610. In step SE1, the DNS responding section 610 receives the DNS inquiry.

In the next step SE15, the DNS responding section 610 adds IP address and representative domain name of the client terminal 100 in the DNS inquiry log in the storing section 170. In step SE16, the DNS responding section 610 decides a destination for routing a service request (IP packet) from the client terminal 100 according to the routing table stored in the storing section 210. In this case, of the path load measuring device 700a and path load measuring device 700b, the path load measuring device 700b is decided as a destination for primary routing. In step SE17, the DNS responding section 610 reports IP address of the path load measuring device 700b as a DNS response to the client terminal 100.

In step SE18, when the client terminal 100 acquires an IP address of a destination for routing (path load measuring device 700b) it receives IP address of the path load measuring device 700b. In step SE19, the client terminal 100 sends the IP packet to access the path load measuring device 700b. The secondary routing section 760 in the path load measuring device 700b receives the IP packet in step SE20, and in step SE21 stores the session information in the storing section 740.

In the next step SE22, the secondary routing section 760 acquires information on operating states of the server terminals 500b and 500c and session information from the storing sections 750 and 740. The secondary section 760 then decides either one in the best operating state of the server terminals 500a and 500b.

It is assumed in the following description that the server terminal 500c is decided as a destination for secondary routing. In step SE23, the secondary routing section 760 routes the IP packet to the server terminal 500c decided in step SE22. Thus, the client terminal 100 receives a service from the server terminal 500c.

As described above, with the relaying apparatus for use in a network system according to the fourth embodiment, a primary destination of routing a service request is selected according to a reference of a path load reflecting the actual situation and an operating state, and then either one of the server terminal 500a to server terminal 500d is selected taking into account the operating state in secondary routing. Therefore, distribution of a work load among a plurality of server terminals can be executed in the-optimal state.

Relaying apparatuses each for use in a network system according to first to fourth embodiments of the present invention are explained above. However, the configuration of the present invention is not limited to these embodiments. Design changes within a gist of the present invention can be included in the present invention.

For instance, in the relaying apparatuses for use in the network system according to first to fourth embodiments described above, a server terminal as an object for accessing indicates all databases, which users want to access, and all server computers on the network providing the Web service.

In the relaying apparatuses each for use in a network system according to first to fourth embodiments described above, terminals inquiring DNS include, in addition to the client terminal 100, DNS servers (FIG. 1: client-side DNS device 110) provided in the vicinity of the client terminal 100.

Further in the relaying apparatuses for use in a network system according to first to fourth embodiments described above, routing may be carried out taking into account, in addition to the effective band width, a combination of other parameters such as round-trip time, number of hops, or the like as path load.

As described above, with the present invention, a destination for routing a service request is executed according to a reference of a path load reflecting the actual situation. Therefore, there is provided the advantage that the work load can be distributed optimally among a plurality of server terminals.

Further, results of measurement by a plurality of path load measuring devices are previously stored, and when a service request is made from one client terminal, the service request is immediately routed without executing real-time measurement by the path load measuring device. Therefore, there is provided the advantage that the work load can be distributed optimally and quickly among a plurality of server.

Further, a destination for routing a service request is selected taking into account, in addition to path load, operating state of each server terminal. Therefore, there is provided the advantage that the work load can be distributed optimally among a plurality of server terminals.

Further, after a primary destination for routing a service request is selected according to a reference of a path load reflecting the actual situation, one server terminal is selected by means of secondary routing. Therefore, there is provided the advantage that the work load can be distributed optimally among a plurality of server terminals.

Further, after a primary destination for routing a service request is selected according to a reference of a path load reflecting the actual situation, one server terminal is selected by means of secondary routing taking into account operating state of each server terminals. Therefore, there is provided the advantage that the work load can be distributed optimally among a plurality of server terminals.

Further, after a primary destination for routing a service request is selected according to a reference of a path load reflecting the actual situation as well as to an operating state of each server terminal, one server terminal is selected by secondary routing taking into account operating state of each server terminal. Therefore, there is provided the advantage that the work load can be distributed optimally among a plurality of server terminals.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system, comprising:
a plurality of client terminals and server terminals providing services to the client terminals via a network;
a plurality of route load measuring units each provided in, or in a vicinity of, each of said server terminals and each measuring a respective load in a TCP or UDP delivery route from the route load measuring unit to one client terminal having issued a request for service out of said client terminals; and
a relaying apparatus, comprising:
a selecting unit which selects a route load measuring unit out of the plurality of route load measuring units as a primary destination of the request for service and the route load measuring unit selects one server terminal out of said server terminals as a secondary destination of the request for service from said one client terminal based on the load measured by said route load measuring units, wherein each of said route load measuring units monitors operating states of respective server terminal and when a request for service is received from said one client terminal, said selecting unit selects one server terminal out of said server terminals as the secondary destination of the request for service from said one client terminal based on the load and the operating states monitored by said load measuring units, wherein operating states include idle and active states; and
a storing unit which stores the load measured at a prespecified time interval by each of said route load measuring units,
wherein when a request for service is received from said one client terminal, said selecting unit selects said one server terminal out of said server terminals as a destination of the request for service from said one client terminal based on the load stored in the storing unit, and
wherein said route load measuring units each measures, as the load, an effective bandwidth of the route based on a plurality of parameters, wherein the parameters include
a round-trip time,
a maximum segment size, and
an adjustable congestion-evading congestion window size for a server terminal utilizing TCP.

2. A system, comprising:
a plurality of client terminals and server terminals that are divided into several groups each having at least two of the server terminals and that provide services to the client terminals via a network;
a plurality of route load measuring units in, or in a vicinity of, each of said server terminals, each provided with respect to each of the groups and each measuring a respective load in a TCP or UDP delivery route from the route load measuring unit to one client terminal having issued a request for service out of said client terminals; and
a relaying apparatus comprising:
a selecting unit which selects one route load measuring unit out of said route load measuring units as a primary destination of the request for service from said one client terminal based on the load measured by said route load measuring units,
said one route load measuring unit selects one server terminal out of the server terminals in the group as a secondary destination of the request for service from said one client terminal, wherein each said route load measuring unit monitors operating states of the respective server terminals in the group, and said one route load measuring unit selects one server terminal out of the server terminals in the group based on the operating states when selecting the secondary destination, and
said route load measuring units each measure, as the load, an effective bandwidth of the route, the effective bandwidth estimated based on a plurality of parameters, wherein the parameters include:
a round-trip time,
a maximum segment size, and
an adjustable congestion-evading congestion window size for a server terminal utilizing TCP.

3. A system, comprising:
a plurality of client terminals and server terminals that are divided into several groups each having at least two of the server terminals and that provide services to the client terminals via a network;
a plurality of route load measuring units in, or in a vicinity of, each of said server terminals, each provided with respect to each of the groups, each measuring a respective load, in a TCP or UDP delivery route from the route load measuring unit to one client terminal having issued a request for service out of said client terminals and monitoring operating states of said server terminals in each group; and
a relaying apparatus, comprising:
a selecting unit which selects one route load measuring unit out of said route load measuring units as a primary destination of the request for service from said one client terminal based on the load measured and the operating states monitored by said route load measuring units where operating states include idle and active states, wherein
said one route load measuring unit selects based on the operating states one server terminal out of the several server terminals in the group as a secondary destination of the request for service from said one client terminal, wherein operating states include idle and active states, and
said route load measuring units each measure, as the load, an effective bandwidth of the route, the effective bandwidth estimated based on a plurality of parameters, wherein the parameters include:
a round-trip time,
a maximum segment size, and
an adjustable congestion-evading congestion window size for a server terminal utilizing TCP.

4. A relaying, comprising:
a plurality of client terminals and server terminals providing services to the client terminals via a network; and a relaying apparatus, comprising
a plurality of path load measuring and operating state monitoring devices in, or in the vicinity of, each of said server terminals, arranged:
   to measure effective bandwidths of TCP or UDP delivery path loads from a client terminal requesting service to server terminals wherein the effective bandwidth is based on a plurality of parameters and wherein the parameters include:
      a round-trip time,
      a maximum segment size, and
      an adjustable congestion-evading congestion window size for a server terminal utilizing TCP,
   and
   to monitor operating states of server terminals wherein the operating states include idle and active states; and
a DNS-responding device to compare effective bandwidths of measurements of path loads from the plurality of path load measuring and operating state monitoring devices to the client terminal and to select a server terminal having a largest effective bandwidth and an active operating state to provide service to the client terminal.

5. A system, comprising:
a plurality of client terminals and server terminals providing services to the client terminals via a network; and
a relaying apparatus, comprising:
a plurality of path load measuring and operating state monitoring devices in, or in a vicinity of, each of said server terminals, arranged:
   to measure, as loads in TCP or UDP delivery paths from a client terminal requesting service to server terminals, effective bandwidths of the paths wherein the effective bandwidth is based on a plurality of parameters and wherein the parameters include:
      a round-trip time,
      a maximum segment size, and
      an adjustable congestion-evading congestion window size for a server terminal utilizing TCP,
      and
   to monitor operating states of server terminals wherein the operating states include idle and active states; and
a DNS-responding device to compare the effective bandwidths measured by the path load measuring and operating state monitoring devices and to select a server terminal having a largest effective bandwidth and an active operating state to provide service to the client terminal.

* * * * *

UNITED STATES PATENT AND TRADEMARK OFFICE
CERTIFICATE OF CORRECTION

PATENT NO. : 7,284,051 B1
APPLICATION NO. : 09/455932
DATED : October 16, 2007
INVENTOR(S) : Tetsuya Okano et al.

It is certified that error appears in the above-identified patent and that said Letters Patent is hereby corrected as shown below:

Title Page item (75) Column 1 (Inventors), Line 3, change "Takaha" to --Takahashi--.

Column 26, Line 5, after "apparatus" insert --,--.

Column 26, Line 63, change "relaying," to --system,--.

Column 27, Line 1, after "comprising" insert --:--.

Signed and Sealed this

Twenty-fifth Day of March, 2008

JON W. DUDAS
*Director of the United States Patent and Trademark Office*